J. T. SHIPP.
PEA HARVESTING MACHINE.
APPLICATION FILED JAN. 25, 1916. RENEWED MAY 18, 1917.

1,230,822.

Patented June 19, 1917.
3 SHEETS—SHEET 1.

INVENTOR.
JAMES T. SHIPP
BY
A. S. McLundie.
ATTORNEY.

J. T. SHIPP.
PEA HARVESTING MACHINE.
APPLICATION FILED JAN. 25, 1916. RENEWED MAY 18, 1917.
1,230,822.
Patented June 19, 1917.
3 SHEETS—SHEET 2.
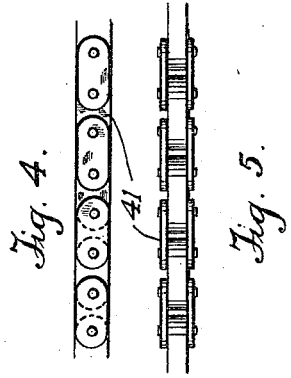
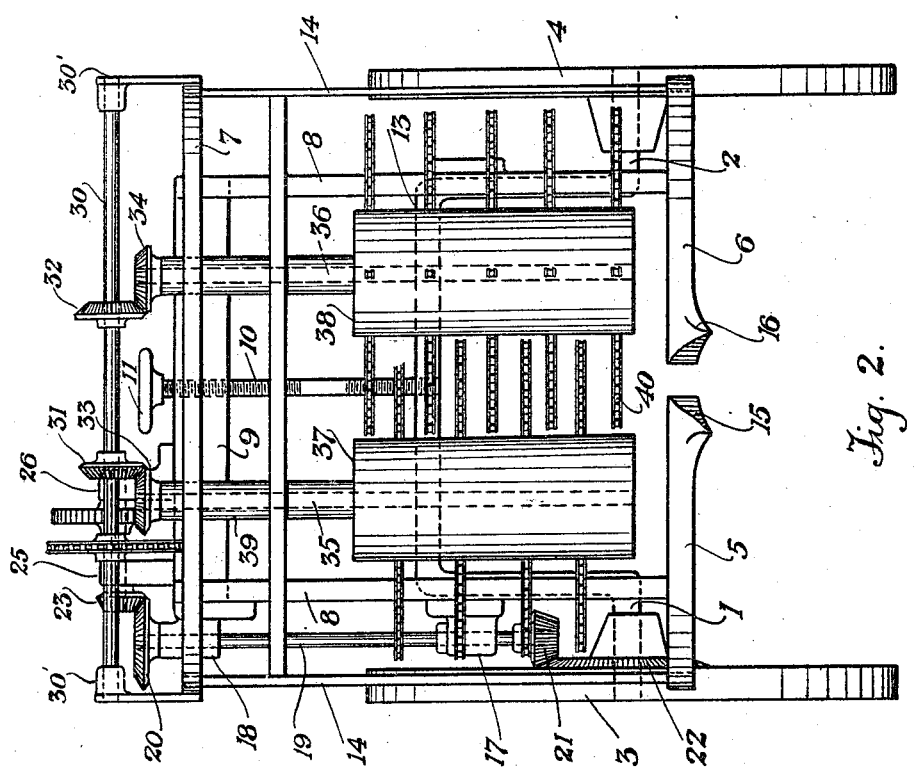
INVENTOR.
JAMES T. SHIPP
BY
A. S. McLundie.
ATTORNEY.

INVENTOR.
JAMES T. SHIPP
BY
A. S. McLundie.
ATTORNEY.

UNITED STATES PATENT OFFICE.

JAMES T. SHIPP, OF CHATTANOOGA, TENNESSEE, ASSIGNOR OF ONE-HALF TO MILTON T. FREEMAN, OF CHATTANOOGA, TENNESSEE.

PEA-HARVESTING MACHINE.

1,230,822.   Specification of Letters Patent.   Patented June 19, 1917.

Application filed January 25, 1916, Serial No. 74,148. Renewed May 18, 1917. Serial No. 169,575.

*To all whom it may concern:*

Be it known that I, JAMES T. SHIPP, a citizen of the United States, residing at Chattanooga, in the county of Hamilton and State of Tennessee, have invented certain new and useful Improvements in a Pea-Harvesting Machine, of which the following is a specification.

My invention relates to a pea harvester of that type characterized by a construction so arranged that the harvester may be run over the vines and will free the pods from the vine and the peas from the pods.

One object of the present invention resides in the provision of means for adjusting the effective height of the pea vine receiving means, whereby the machine may be easily adapted for vines of different heights.

A further object consists in providing novel means for removing the pods from the vines and freeing the peas from the pods.

A still further object resides in the provision of simple and effective means for separating the peas and broken pods, and conveying the former to a suitable storage compartment.

And a final object consists in so arranging the structure hereinbefore outlined that all the moving parts thereof, except the adjustable pea vine receiving means, are operated from the wheel structure of the harvester.

With the above and other objects in view, I will now proceed to describe a specific embodiment of my invention as illustrated in the accompanying drawing, wherein:

Fig. 2 is a view in front elevation.

Figs. 4 and 5 are views, showing respectively in plan view and in side elevation, the construction of flexible jointed beaters or flails.

Figure 1:
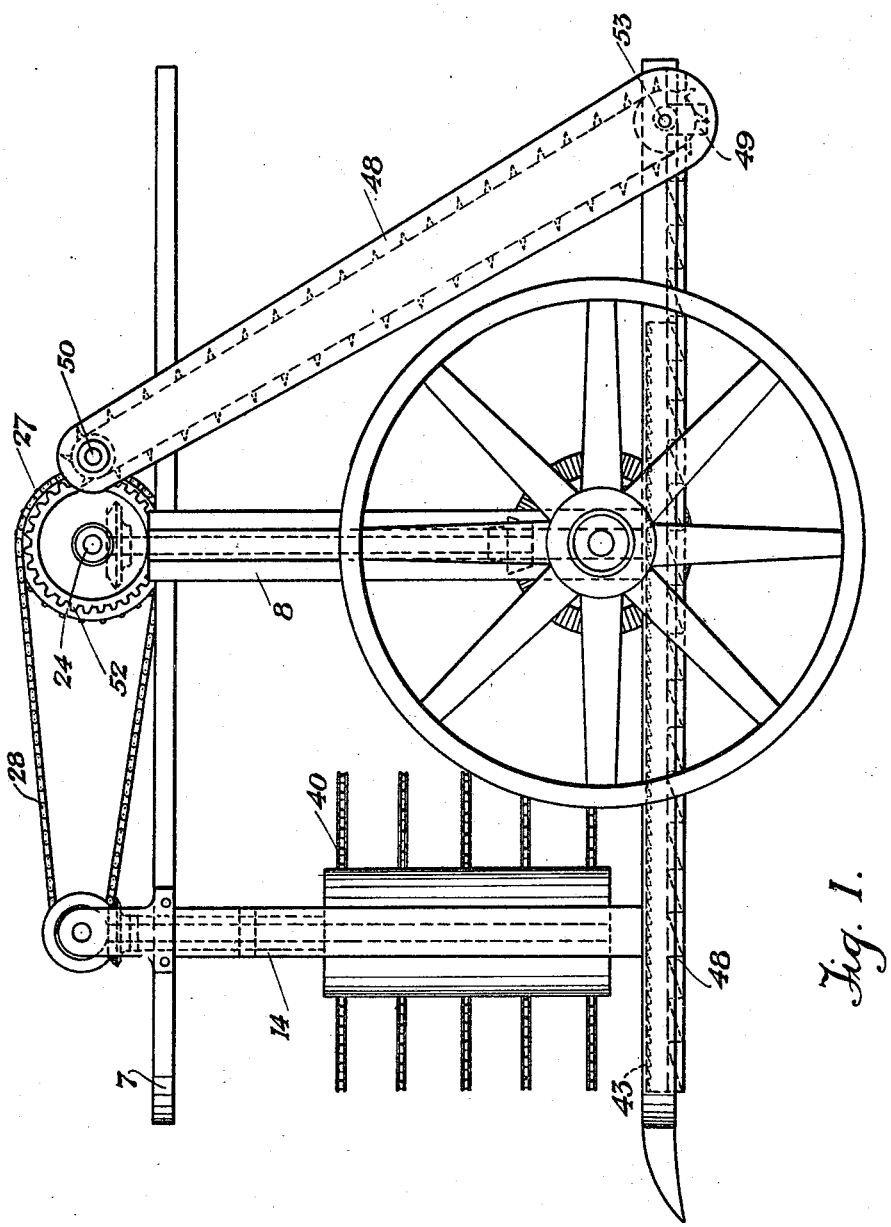
Figure 1 is a view of the pea harvester, in side elevation.
Figure 3:
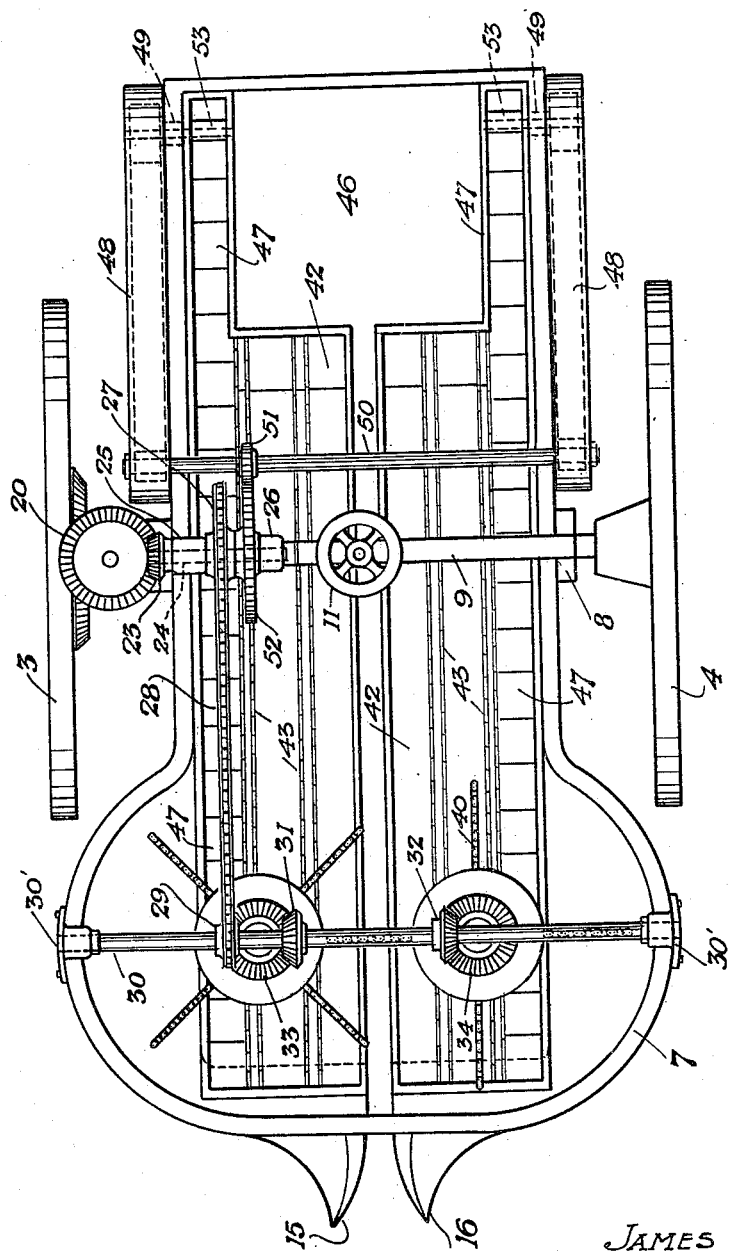
Fig. 3 is a top plan view.

In detail:

The pea harvester comprises the axles 1 and 2 carrying wheels 3 and 4, respectively. Supported by the axles 1 and 2 are the bottom frame members 5 and 6 which, in turn, carry the weight of the upper frame member 9 supported from said first mentioned frame members by means of the vertical stays 8. At the top of the harvester is a transversally extending member 9 in which is journaled one end of a spindle 10 provided with a handwheel 11. The other end of said spindle 10 is threaded into a second transverse member 13. The top member 7 is supported by the vertical stays 8 and carries at its extreme sides, the vertical members 14; said members 14 carry, at their lower ends, the pea vine receiving means which consists of the two opposing members 15 and 16, shaped on their adjacent ends in such a manner as to properly guide the vine through the machine. The members 15 and 16, by reason of the arrangement of spindle 10, may be raised or lowered as required. Journaled in a bearing 17 carried by member 13 and also in a bearing 18 carried by member 9 is a vertical shaft 19 carrying at its upper end a bevel gear 20 and at its lower end a bevel pinion 21, the latter meshing with a bevel gear 22 on axle 1; while the former meshes with a bevel pinion 23 on a transverse shaft 24 mounted in bearings 25 and 26.

The said shaft 24 carries a sprocket 27 over which a chain 28 runs, said chain engaging a smaller sprocket 29 on a shaft 30 journaled in supports 30' and provided with bevel gears 31 and 32 which mesh with bevel gears 33 and 34 on shafts 35 and 36 carrying drums 37 and 38, said shafts being journaled in bearings 39.

The drums 37 and 38 carry flexible jointed beaters or flails 40 which are composed of a series of links 41 and are so constructed that they stand out laterally and yet are flexible laterally. The arrangement and setting of the drums 37 and 38 are such that the flails 41, when the drums revolve, intermesh and exert a rubbing action against the vine which not only removes the pods but ruptures the latter to free the peas.

The peas and pods thus freed of the vine drop on to the shaking screens 42. These screens have saw teeth projections as 43 on top, which with the assistance of the shaking screens will carry the empty pods and stalks which have been broken off, to the rear of the screens as at 46 and fall on the ground.

The screens 42 are sloped with the lower ends toward the wheels. These ends form compartments such as 47 which are made deeper than the inner part of the screen and have the bottoms shaped in saw tooth form such as 48. The compartments 47 are continued beyond the ends of the screen 42 and as the peas have now worked their way into these sections they are led into the conveyers 48 by means of a chute as 49.

The conveyers are driven through the medium of a shaft 50 connected by a gear 51 to a gear 52 on a shaft 24.

The shaking or oscillating motion of the screens 42 is obtained by means of a cam or eccentric arrangement on the shaft 53 which in turn is driven from the shaft 50 by means of the belt forming the inner part of the conveyer.

The peas after being carried up the conveyer are led into sacks or the like.

While in the foregoing specification, I have described a specific embodiment of the present invention, it is nevertheless to be understood that, in practice, I may resort to such practical modifications as fall within the scope of the invention as defined in the appended claims.

I claim:

1. In a harvester, threshing means to remove a product from a plant, such means including drums, and flails laterally extending from said drums and flexible only in a horizontal plane.

2. In a harvester, threshing means, including vertically disposed drums rotatable in opposite directions and laterally extending flails flexible only in a horizontal plane, said flails intermeshing as said drums are rotated.

3. In a harvester, threshing means to remove a product from a plant, such means including vertically disposed drums rotatable in opposite directions and means to guide the plant between said drums, flails extending from said drums and retained in a horizontal plane and flexible only in a horizontal plane.

In testimony whereof I have hereunto set my hand in the presence of two subscribing witnesses.

JAMES T. SHIPP.

Witnesses:
Jno. N. Johnson,
H. H. Sutton.

Copies of this patent may be obtained for five cents each, by addressing the "Commissioner of Patents, Washington, D. C."